US012472113B2

(12) United States Patent
Nomura et al.

(10) Patent No.: US 12,472,113 B2
(45) **Date of Patent: *Nov. 18, 2025**

(54) ASSISTIVE APPARATUS

(71) Applicant: FUJI CORPORATION, Aichi-ken (JP)

(72) Inventors: Hideaki Nomura, Toyota (JP); Ryu Takahashi, Toyota (JP); Nobuyuki Nakane, Toyota (JP); Kuniyasu Nakane, Okazaki (JP)

(73) Assignee: FUJI CORPORATION, Aichi-ken (JP)

(*) Notice: Subject to any disclaimer, the term of this patent is extended or adjusted under 35 U.S.C. 154(b) by 1080 days.

This patent is subject to a terminal disclaimer.

(21) Appl. No.: 17/601,701

(22) PCT Filed: Apr. 12, 2019

(86) PCT No.: PCT/JP2019/016064

§ 371 (c)(1),
(2) Date: Oct. 5, 2021

(87) PCT Pub. No.: WO2020/208831

PCT Pub. Date: Oct. 15, 2020

(65) Prior Publication Data

US 2022/0211562 A1 Jul. 7, 2022

(51) Int. Cl.
*A61G 5/14* (2006.01)
*A61G 7/10* (2006.01)

(52) U.S. Cl.
CPC ............. *A61G 5/14* (2013.01); *A61G 7/1046* (2013.01); *A61G 2200/34* (2013.01); *A61G 2200/36* (2013.01); *A61G 2203/10* (2013.01)

(58) Field of Classification Search
CPC .... A61G 5/14; A61G 7/1046; A61G 2200/34; A61G 2200/36; A61G 2203/10;
(Continued)

(56) References Cited

U.S. PATENT DOCUMENTS 5,117,516 A * 6/1992 Penner ................. A61G 7/1094 5/81.1 R
6,119,287 A * 9/2000 Phillips ................ A61G 7/1046 5/81.1 RP
(Continued)

FOREIGN PATENT DOCUMENTS

CN 101069661 11/2007
CN 109069333 12/2018
(Continued)

OTHER PUBLICATIONS

"International Search Report (Form PCT/ISA/210) of PCT/JP2019/016064", mailed on Jun. 18, 2019, with English translation thereof, pp. 1-4.

*Primary Examiner* — Valerie L Woodward
(74) *Attorney, Agent, or Firm* — JCIPRNET

(57) ABSTRACT

An assistive apparatus includes a base, a first arm provided on the base and configured to revolve around a horizontal first center axis, a second arm provided on the first arm and configured to revolve around a horizontal second center axis, a support member provided on the second arm and configured to support an upper half body of an assisted person, and a driving device configured to perform a cooperative operation of the first arm and the second arm. The first arm is configured to be located ahead of a knee bending position at which an upper thigh portion and a lower thigh portion of the assisted person bend in an initial state before execution of assistance of a standing operation.

15 Claims, 6 Drawing Sheets

(58) Field of Classification Search

CPC .. A61G 7/1001; A61G 7/1013; A61G 7/1017; A61G 7/1059; A61G 7/1073; A61G 2200/52; A61G 5/10; Y02A 40/81; A61H 3/04; A61H 2003/043

See application file for complete search history.

(56) References Cited

U.S. PATENT DOCUMENTS

| | | | | |
|---|---|---|---|---|
| 2009/0165203 | A1 * | 7/2009 | Biersteker ................ | A61G 5/14<br>5/83.1 |
| 2019/0142670 | A1 | 5/2019 | Nomura et al. | |

FOREIGN PATENT DOCUMENTS

| | | |
|---|---|---|
| JP | 2004223151 | 8/2004 |
| JP | 2008073501 | 4/2008 |
| JP | 2010227178 | 10/2010 |
| JP | 2011019571 | 2/2011 |
| JP | 2012115603 | 6/2012 |
| WO | 2011151639 | 12/2011 |
| WO | 2018116472 | 6/2018 |

* cited by examiner

[Fig. 1]
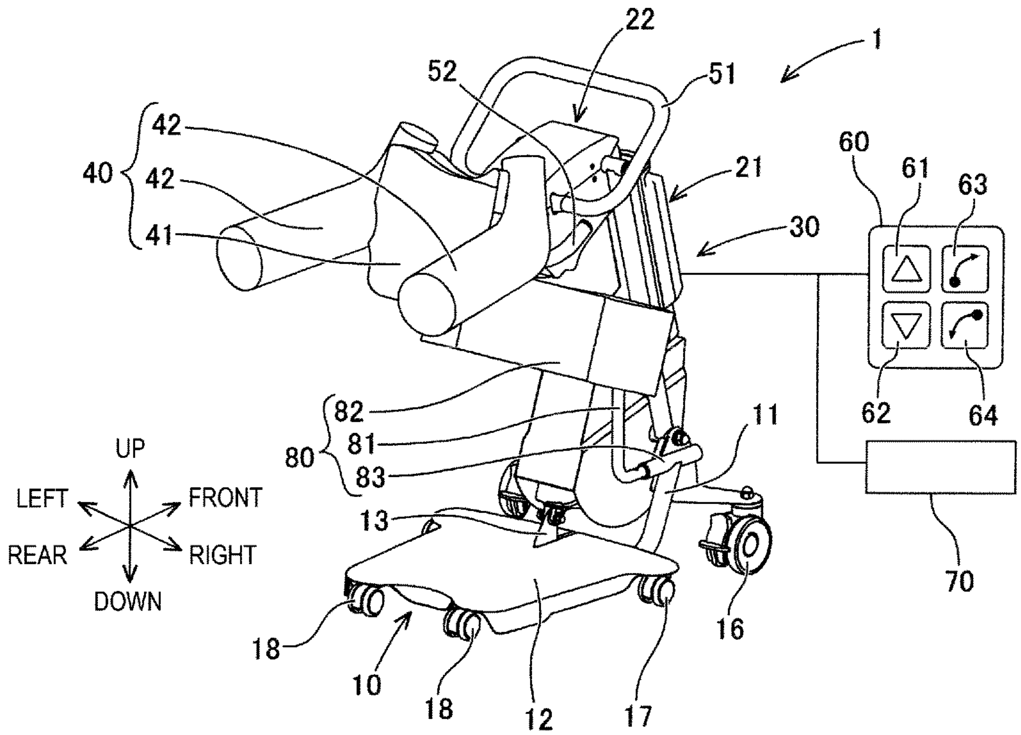
[Fig. 2]
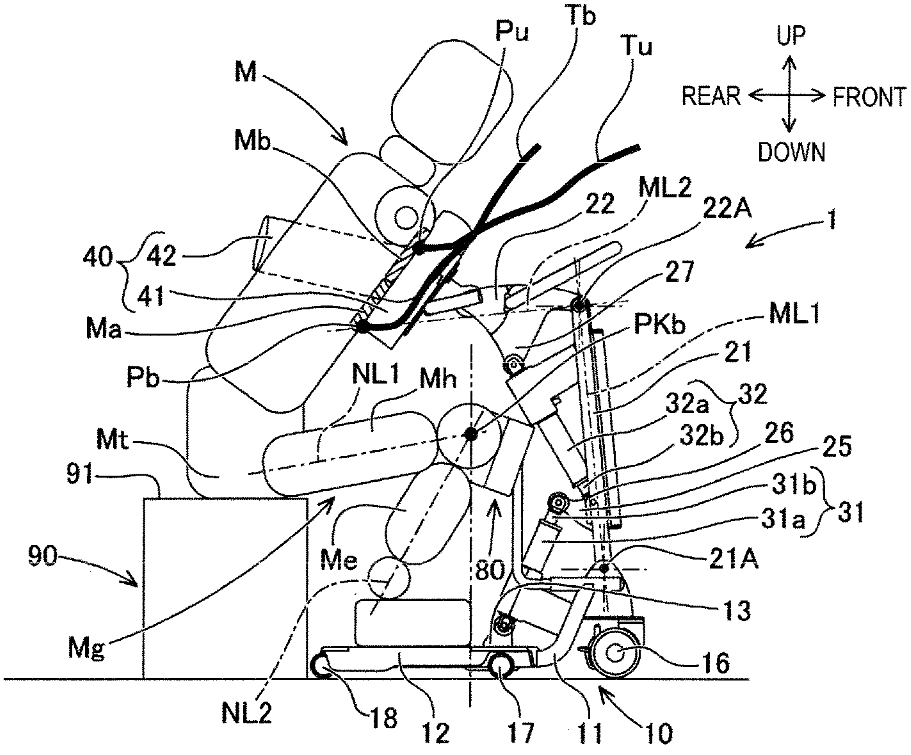

[Fig. 3]
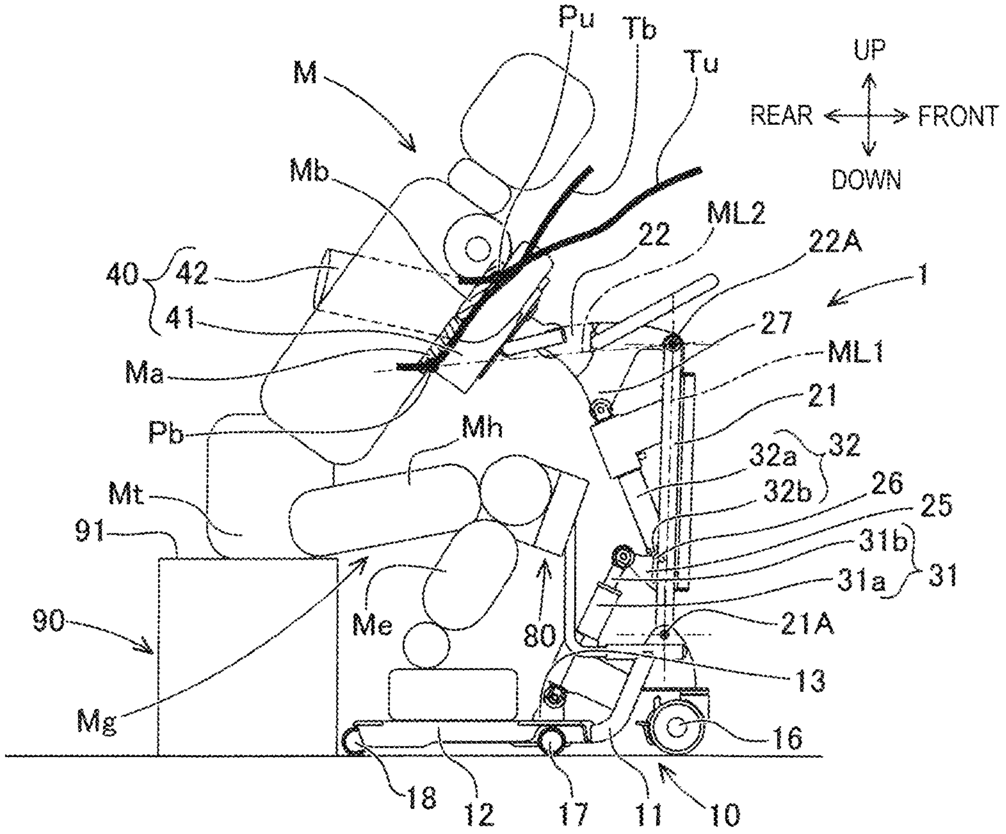

[Fig. 4]
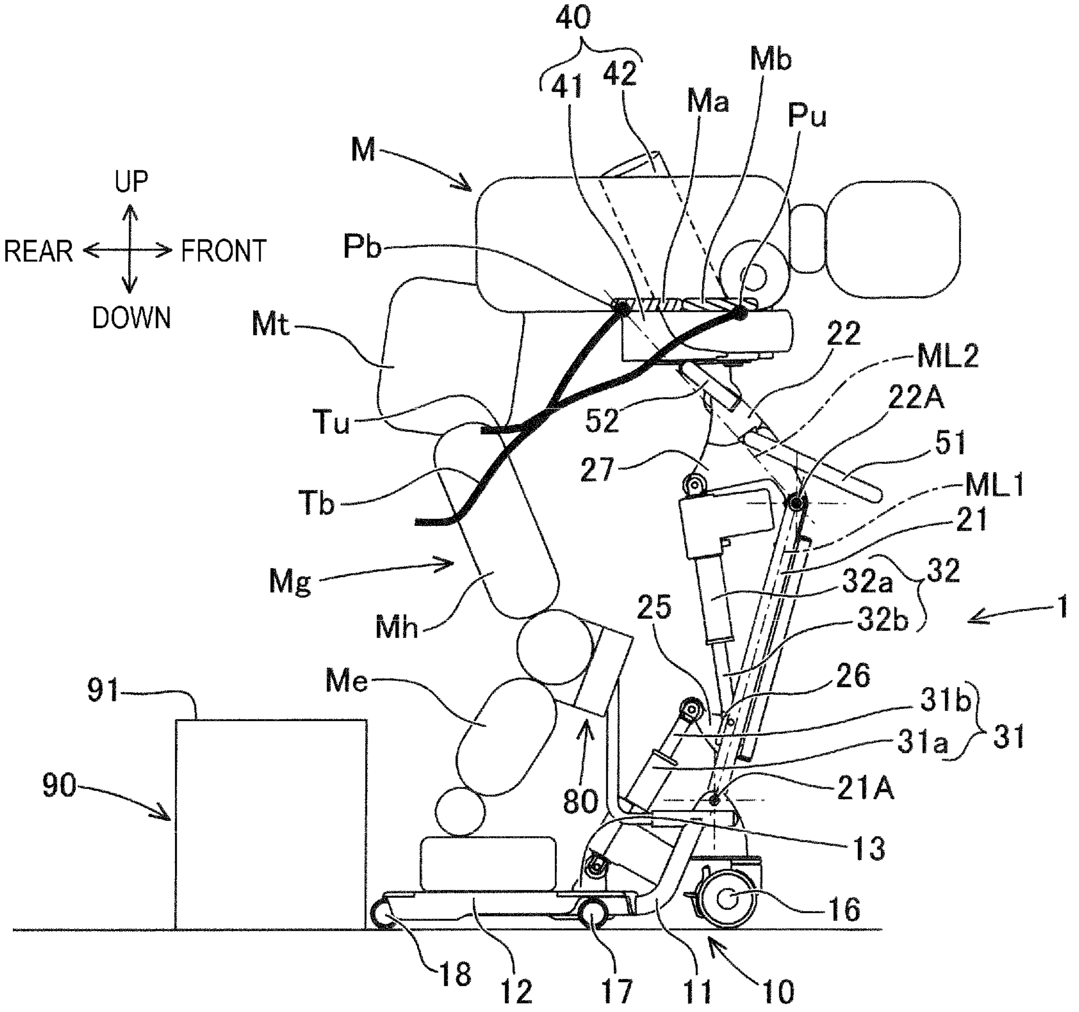

[Fig. 5]
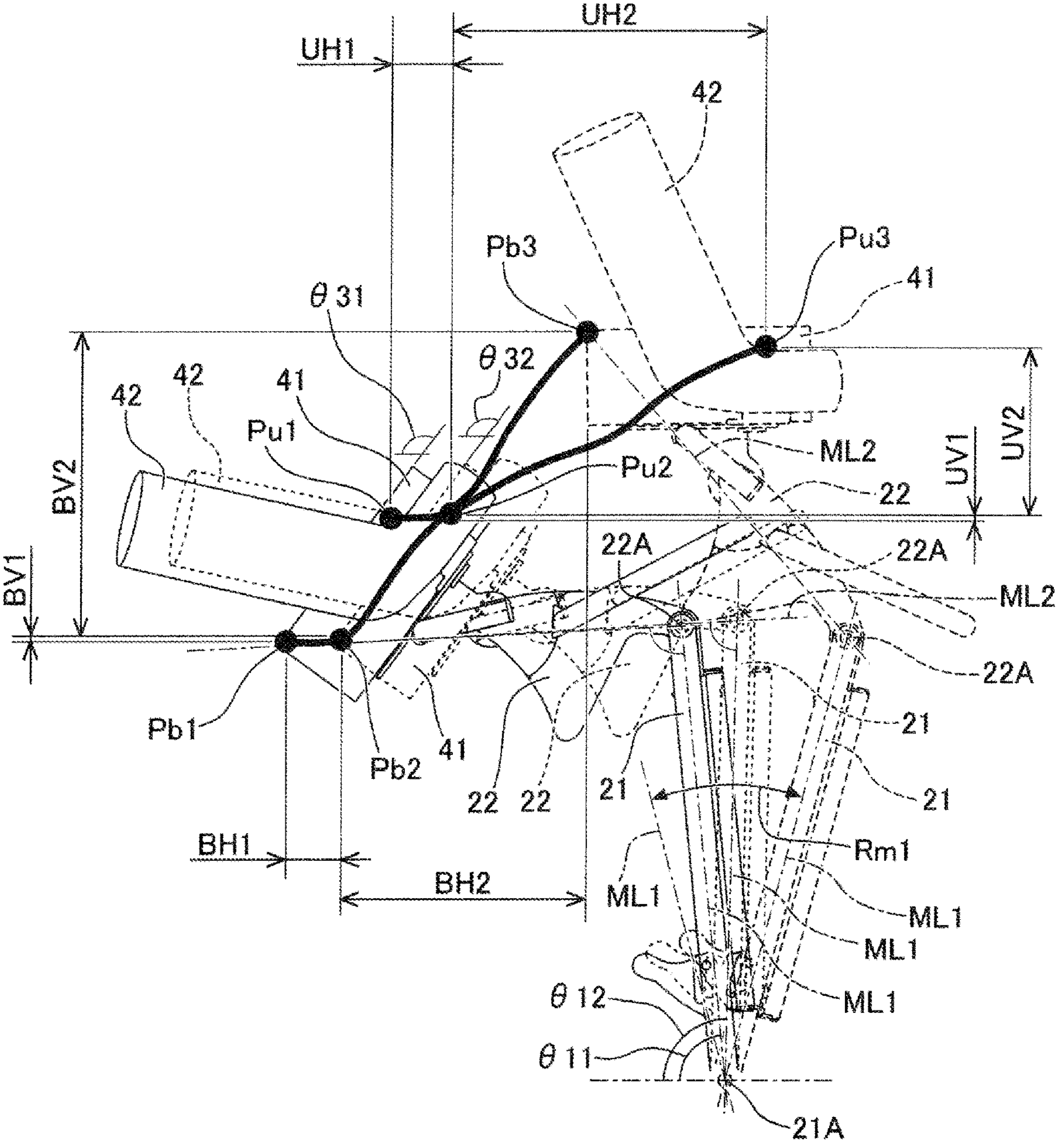

[Fig. 6]
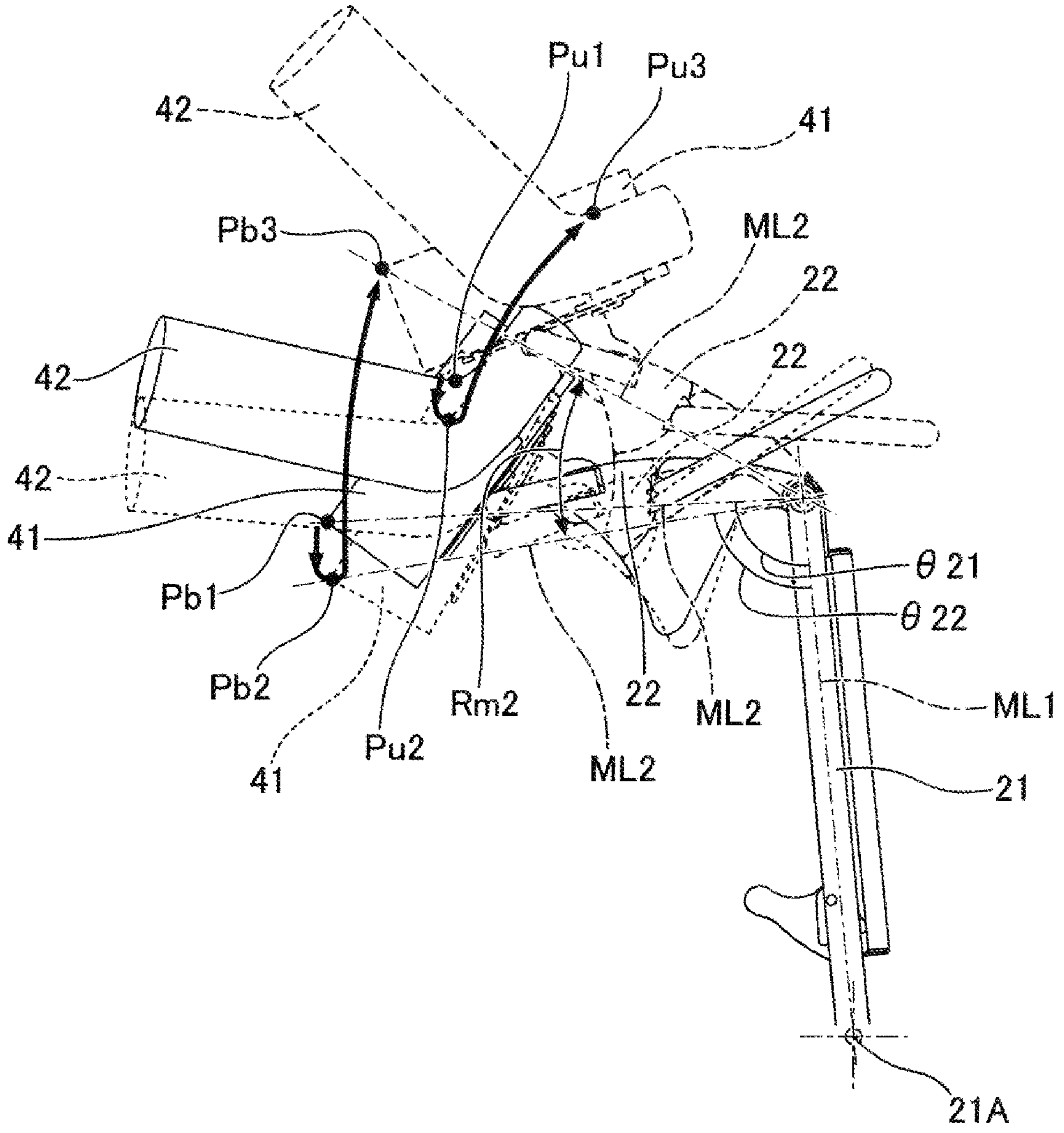

[Fig. 7]
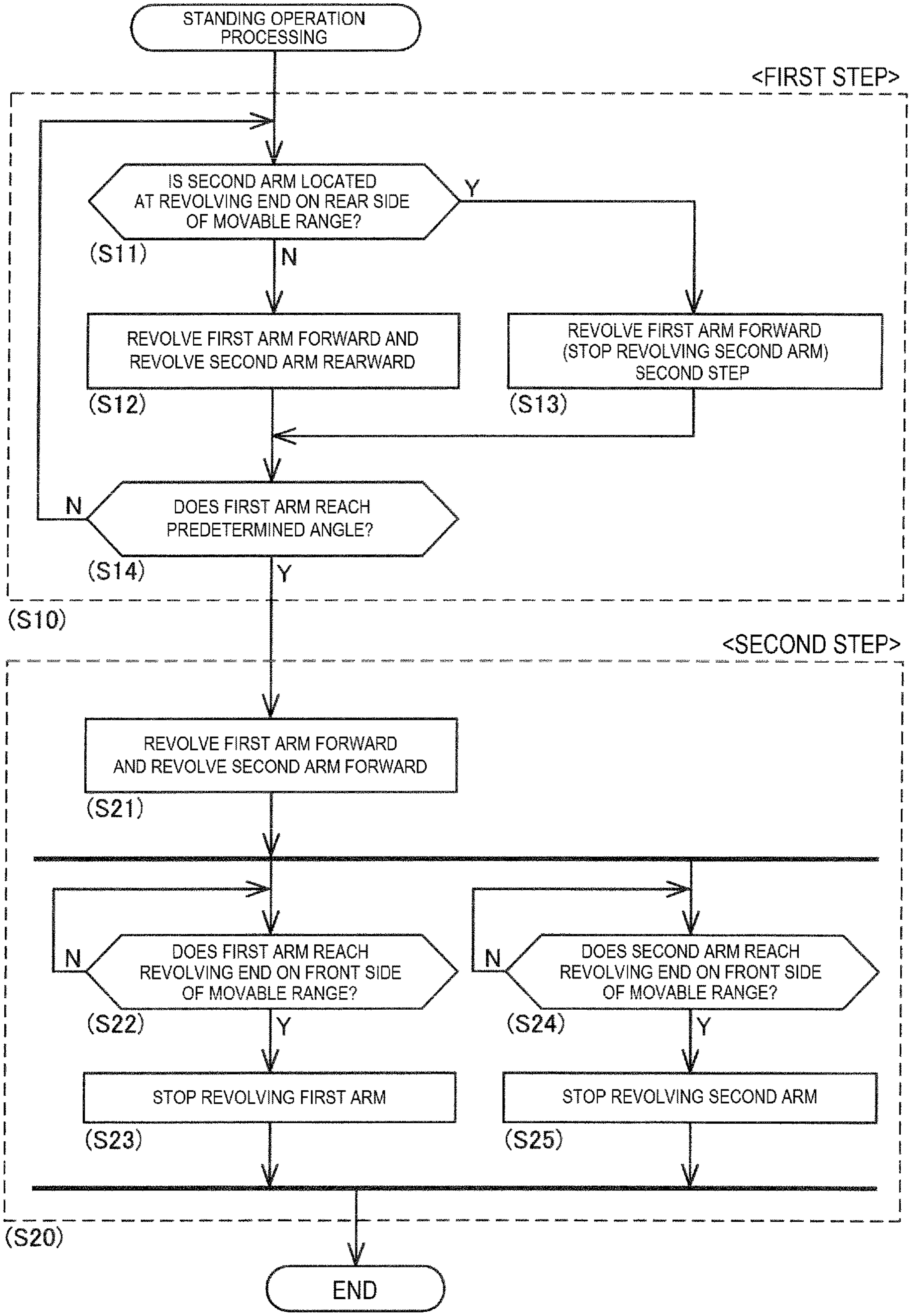

ASSISTIVE APPARATUS

CROSS-REFERENCE TO RELATED APPLICATION

This application is a 371 application of the International PCT application serial no. PCT/JP2019/016064, filed on Apr. 12, 2019. The entirety of the above-mentioned patent application is hereby incorporated by reference herein and made a part of this specification.

TECHNICAL FIELD

The present invention relates to an assistive apparatus.

BACKGROUND

Patent Literature 1 and Patent Literature 2 disclose assistive apparatuses that assist a standing operation of an assisted person. The assistive apparatus of Patent Literature 1 is provided with a driving device including a rotating device that tilts a support member supporting the assisted person, and a linear motion device that lifts and lowers the support member and the rotating device. The assistive apparatus of Patent Literature 2 is provided with a driving device including three rotating devices that enable the support member to be moved to an arbitrary position and angle.

PATENT LITERATURE

Patent Literature 1: International Publication No. 2018/116472
Patent Literature 2: JP-A-2011-019571

SUMMARY

Technical Problem

There is a demand for the assistive apparatus to simplify the driving device from the viewpoint of downsizing and manufacturing cost while allowing the support member that assists the standing operation of the assisted person to move. In particular, the linear motion device configured to constitute the driving device has high accuracy required for the constituent members and is likely to cause an increase in manufacturing cost. In addition, when the driving device includes three or more rotating devices or the like, the device may be easily increased in size, and the configuration of a power source and a path of a signal may be complicated.

It is an object of the present specification to provide an assistive apparatus capable of downsizing and reducing the manufacturing cost while assisting the standing operation of the assisted person.

Solution to Problem

The present specification discloses an assistive apparatus including a base, a first arm provided on the base and configured to revolve around a horizontal first center axis, a second arm provided on the first arm and configured to revolve around a horizontal second center axis, a support member provided on the second arm and configured to support an upper half body of an assisted person, and a control device configured to perform a cooperative operation of the first arm and the second arm in assisting a standing operation of the assisted person supported by the support member, in which the first arm is configured to be located ahead of a knee bending position at which an upper leg portion and a lower leg portion of the assisted person bend in an initial state before execution of assistance of the standing operation.

The present specification discloses an assistive apparatus including a base, a first arm provided on the base and configured to revolve around a horizontal first center axis, a second arm provided on the first arm and configured to revolve around a horizontal second center axis, a support member provided on the second arm and configured to support an upper half body of an assisted person, and a control device configured to perform a cooperative operation of the first arm and the second arm in assisting a standing operation of the assisted person supported by the support member, in which operation processing for assisting the standing operation includes a first step of revolving the second arm rearward in parallel with revolving the first arm forward at an initial stage of the standing operation.

Advantageous Effect of the Invention

With such a configuration, the support member can be moved along a predetermined movement trajectory by the first arm and the second arm constituting the mechanism including two joints with respect to the base. As a result, the assistive apparatus can assist the standing operation of the assisted person. In addition, the assistive apparatus has a configuration for causing the revolving of the first arm and the revolving of the second arm to cooperate with each other, so that it is possible to downsize and reduce the manufacturing cost of the assistive apparatus as compared with a configuration including a linear motion device or three or more rotating devices.

BRIEF DESCRIPTION OF THE DRAWINGS

FIG. 1 is a perspective view of an assistive apparatus of an embodiment as viewed obliquely from a rear.

FIG. 2 is a side view illustrating the assistive apparatus in an initial state where it supports an assisted person in a sitting posture.

FIG. 3 is a side view illustrating the assistive apparatus that supports the assisted person in an intermediate posture.

FIG. 4 is a side view illustrating the assistive apparatus in a standing support state where supports the assisted person in a standing posture.

FIG. 5 is a diagram illustrating operations of a first arm, a second arm, and a support member in assisting an operation of a standing operation, as well as a movement trajectory of a lower reference position and a movement trajectory of an upper reference position.

FIG. 6 is a diagram illustrating an operation of the second arm and a movable range of the second arm in assisting the operation of the standing operation.

FIG. 7 is a flowchart illustrating processing for assisting the operation of the standing operation.

DESCRIPTION OF THE EMBODIMENTS

1. Configuration of Assistive Apparatus 1

A configuration of assistive apparatus 1 of the embodiment will be described with reference to FIGS. 1 to 4. Assistive apparatus 1 assists assisted person M (refer to FIG. 2 or the like) in a standing operation from a sitting posture to a standing posture, and in a sitting operation from the standing posture to the sitting posture. When assistive apparatus 1 supports an upper half body of assisted person M in the standing posture, one assisting person can pull assistive apparatus 1 or the like to move assistive apparatus 1 to, for example, a moving target in an assisting facility.

The "standing posture" means a posture in which a lower half body of assisted person M is standing. As illustrated in FIG. 4, in the present specification, a posture in which buttocks Mt is lifted from the sitting posture, the lower half body stands, and the upper half body is tilted forward is defined as a standing posture of assisted person M. That is, assistance for the standing operation is assistance for an operation in which the posture is such that buttocks Mt of assisted person M is lifted, and the upper half body is tilted forward to place the mass of the upper half body in assistive apparatus 1. In addition, the assistance for the sitting operation is assistance for an operation of lowering the position of buttocks Mt of assisted person M.

As illustrated in FIG. 1, assistive apparatus 1 is provided with base 10. More specifically, base 10 includes frame 11 forming a main body of base 10. In the present embodiment, base 10 includes foot placing table 12 provided so as to be horizontal to frame 11. Both legs Mg of assisted person M are placed on foot placing table 12. Assistive apparatus 1 may adopt an aspect in which foot placing table 12 is not provided depending on the level of assisting required by assisted person M. Base 10 includes first actuator support portion 13 provided upward closer on a front side of an upper surface of foot placing table 12.

Three wheels 16 to 18 are each provided on the right and left sides on the lower side of foot placing table 12. Each of wheels 16 to 18 has a steering function for changing the movement direction. Foremost wheel 16 has a locking function for restricting movement. Assistive apparatus 1 is capable of not only moving and changing the direction in the front-rear direction, but also laterally moving (moving in the true lateral direction) and spin turn (revolving on the spot) by the steering function of six wheels 16 to 18.

Assistive apparatus 1 is provided with knee pad member 80. Knee pad member 80 is a member provided on base 10 and on which the knee of assisted person M assisted in the standing operation abuts. Knee pad member 80 is provided to stabilize the standing operation or the sitting operation of assisted person M by determining the position of the knee of assisted person M. Knee pad member 80 includes support rod 81, buffer member 82, and position adjustment portion 83. Support rod 81 is formed in an L-shape and supports buffer member 82.

Buffer member 82 is a cushion material provided on support rod 81 and extending in the right-left direction. Buffer member 82 is covered with, for example, a protective cover made of cloth or leather. Position adjustment portion 83 slidably supports support rod 81 in the front-rear direction. Position adjustment portion 83 is configured to be able to adjust the position of buffer member 82 in the front-rear direction so as to be compatible with a physique and the sitting posture of assisted person M. After the positional adjustment using position adjustment portion 83, the positions of support rod 81 and buffer member 82 in the front-rear direction are set by positioning pins (not illustrated).

Assistive apparatus 1 is provided with first arm 21 and second arm 22. As illustrated in FIG. 2, first arm 21 is provided on base 10 and revolves around horizontal first center axis 21A. Second arm 22 is provided on first arm 21 and revolves around horizontal second center axis 22A. In the present embodiment, as illustrated in FIG. 2, first arm 21 is formed so as to extend upward from first center axis 21A in an initial state before the assisted person is boarded. In addition, second arm 22 is formed so as to extend rearward from second center axis 22A in the initial state.

As described above, first arm 21 and second arm 22 constitute an operation mechanism including two joints with respect to base 10. First arm 21 and second arm 22 support member 40 that supports the upper half body of assisted person M so as to be movable in the up-down direction and the front-rear direction of base 10. In addition, first arm 21 includes two second actuator support portions 25 provided rearward from a lower side of a center portion in the up-down direction and disposed side by side in the extension direction of first arm 21 with each other and third actuator support portion 26. In addition, second arm 22 includes fourth actuator support portion 27 protruding downward from a center portion in the right-left direction and provided downward. Detailed configurations of first arm 21 and second arm 22 will be described later.

Assistive apparatus 1 is provided with driving device 30 that causes first arm 21 and second arm 22 to revolve in operation processing for assisting the standing operation of assisted person M supported by support member 40. In the present embodiment, driving device 30 is provided with first actuator 31 and second actuator 32. First actuator 31 and second actuator 32 are telescopic actuators.

More specifically, first actuator 31 includes main body portion 31*a* and movable portion 31*b*. Main body portion 31*a* is formed in a cylindrical shape having an open end portion. Movable portion 31*b* is formed in a columnar shape having a smaller diameter than that of main body portion 31*a*, and a first end thereof is inserted from the opening of main body portion 31*a*. First actuator 31 moves movable portion 31*b* in the extension direction with respect to main body portion 31*a* by a driving force of a motor (not illustrated).

In addition, since second actuator 32 is the same type as first actuator 31, detailed descriptions thereof will be omitted. Main body portion 32*a* and movable portion 32*b* of second actuator 32 correspond to main body portion 31*a* and movable portion 31*b* of first actuator 31. First actuator 31 and second actuator 32 can use different types of drive sources such as a pressure driving source using hydraulic pressure or pneumatic pressure instead of the above motor.

Here, first actuator 31 and second actuator 32 are provided behind first arm 21. In addition, first actuator 31 is provided so as to be tilted forward from base 10 side toward first arm 21 side. Specifically, first actuator 31 is provided so as to be rotatable at a first end on main body portion 31*a* side to first actuator support portion 13 of base 10, and is provided so as to be rotatable at a second end on movable portion 31*b* side to second actuator support portion 25 of first arm 21.

In addition, second actuator 32 is provided above first actuator 31 and tilted rearward from first arm 21 side toward second arm 22 side. Specifically, second actuator 32 is provided so as to be rotatable at a first end on movable portion 32*b* side to third actuator support portion 26 of first arm 21, and is provided so as to be rotatable at a second end on main body portion 32*a* side to fourth actuator support portion 27 of second arm 22.

With the configuration as described above, driving device 30 causes first arm 21 to revolve forward around first center axis 21A by an extension operation of first actuator 31, and causes first arm 21 to revolve rearward by a shortening operation of first actuator 31. In addition, driving device 30 causes second arm 22 to revolve forward around second center axis 22A by the extension operation of second actuator 32, and causes second arm 22 to revolve rearward by the shortening operation of second actuator 32. In driving device 30, the operations of first actuator 31 and second actuator 32 are controlled by control device 70.

In addition, as described above, both first actuator 31 and second actuator 32 are configured to be provided behind first arm 21. As a result, first and second actuators 31 and 32 are housed on the rear side where base 10 and second arm 22 are disposed with respect to first arm 21, so that entire assistive apparatus 1 is compact in the front-rear direction. Furthermore, by providing first actuator 31 and second actuator 32 so as to be tilted forward or rearward as described above, it is possible to ensure a space for assisted person M to board behind first arm 21 and below second arm 22.

Assistive apparatus 1 is provided with support member 40 that supports the upper half body of assisted person M. Support member 40 is provided on second arm 22. In the present embodiment, support member 40 is provided with trunk support portion 41 and a pair of side support portions 42. Trunk support portion 41 is formed in a planar shape close to the trunk shape of assisted person M. Trunk support portion 41 is formed of a material that can be flexibly deformed. The support surface of trunk support portion 41 is in surface contact with a front surface of the trunk of the upper half body of assisted person M to support the trunk. More specifically, the support surface of trunk support portion 41 supports a range extending from a chest portion Mb to an abdomen portion Ma of assisted person M. Trunk support portion 41 is attached to a rear end portion of second arm 22.

In addition, trunk support portion 41 is supported so as to be able to freely tilt in the front-rear direction with respect to second arm 22. Specifically, trunk support portion 41 is configured to be able to tilt within a predetermined angle range in the clockwise direction in FIG. 2 from the state illustrated in FIG. 2. The above "free tilt" means a tilt that can be manually moved, not a tilt driven by an actuator or the like.

The pair of side support portions 42 is supported by trunk support portion 41 and supports the side of assisted person M. More specifically, the pair of side support portions 42 are provided on the right and left sides of trunk support portion 41. Side support portion 42 is swingably supported by trunk support portion 41. Side support portion 42 is formed in an L-shape by a rod-like member. The surface of side support portion 42 is covered with a material that can be flexibly deformed.

Assistive apparatus 1 is provided with first handle 51 and second handle 52. First handle 51 is formed in a substantially rectangular frame shape. First handle 51 is formed so as to extend forward and upward from the rear end portion of second arm 22. Side portions of first handle 51 are gripped by both hands of assisted person M. Furthermore, the side portion and the front portion of first handle 51 are gripped by the assisting person to move assistive apparatus 1.

Second handle 52 is integrally provided on a front surface of trunk support portion 41. Second handle 52 is formed in an elongated U-shape. Second handle 52 is provided with a base shaft portion fixed to a lower portion of trunk support portion 41 and extending in the right-left direction, and a gripping portion extending from both ends of the base shaft portion toward first handle 51 side.

Assistive apparatus 1 is provided with controller 60 that receives an operation of assisted person M or the assisting person. As illustrated in FIG. 1, controller 60 is provided with up button 61, down button 62, standing button 63, and sitting button 64. Up button 61 and down button 62 receive a request for adjusting the position of support member 40 in the up-down direction. Standing button 63 receives an assistance request for the standing operation. Sitting button 64 receives an assistance request for the sitting operation. Controller 60 may omit up button 61 and down button 62, for example, in a case where the adjustment movement in the up-down direction is included in the movement trajectory of support member 40.

Assistive apparatus 1 is provided with control device 70 that controls driving device 30 and moves support member 40 supporting assisted person M. Control device 70 performs a cooperative operation of first arm 21 and second arm 22 in assisting the standing operation or the sitting operation of assisted person M. Here, the above "cooperative operation" means that a first one of first arm 21 and second arm 22 operates in accordance with the state of a second one. Accordingly, the operation in which the revolving of first arm 21 and the revolving of second arm 22 cooperate with each other includes a state where both first arm 21 and second arm 22 are revolved, and a state where only one of first arm 21 and second arm 22 is revolved. Driving device 30 moves support member 40 along a predetermined movement trajectory by performing the cooperative operation of first arm 21 and second arm 22 as described above. Control device 70 controls the movement of support member 40 in response to an adjustment request or an assistance request inputted via controller 60.

In the present embodiment, controller 60 is assumed to have an operation request (adjustment request or assistance request) only during a period when any button is pressed. In addition, in a case where there is an operation request, control device 70 may not execute an operation corresponding to the request depending on the operation state of assistive apparatus 1. This is assumed to be, for example, a case where the posture of assisted person M is inappropriate for the movement of support member 40 in accordance with the request, or a case where the movement of support member 40 reaches the boundary of the movable range.

2. Detailed Configurations of First Arm 21 and Second Arm 22

Detailed configurations of first arm 21 and second arm 22 of assistive apparatus 1 configured as described above will be described with reference to FIGS. 2, and 4 to 6. Here, the state before the execution of the operation processing for assisting the standing operation of assisted person M is defined as an initial state of assistive apparatus 1 (refer to FIG. 2). In the initial state of assistive apparatus 1, the position of support member 40 in the up-down direction is adjusted in accordance with, for example, the physique of assisted person M or the height of seat surface 91 of chair 90. In addition, a state where trunk support portion 41 of support member 40 supports the trunk of assisted person M in the standing posture from below is defined as a standing support state (refer to FIG. 4).

As described above, first arm 21 is provided on base 10 so as to be revolvable around first center axis 21A. In the present embodiment, first arm 21 is formed in a linear shape along first virtual line ML1 passing through first center axis 21A and second center axis 22A so as to extend upward from first center axis 21A in the initial state of assistive apparatus 1. In addition, second arm 22 is formed so as to extend rearward from second center axis 22A in the initial state of assistive apparatus 1.

Here, as illustrated in FIG. 2, first center axis 21A is set to be located in the vicinity of an attaching position of front wheel 16 in the front-rear direction, and to be located between base 10 and knee pad member 80 in the up-down direction. Specifically, first center axis 21A is located at a position lower than knee bending position PKb of the assisted person. In addition, second center axis 22A is located behind first center axis 21A in the initial state of assistive apparatus 1. That is, the extension direction of first arm 21 is tilted rearward with respect to a vertical axis in the initial state.

Furthermore, second center axis 22A is located ahead of knee bending position PKb at which upper leg portion Mh and lower leg portion Me of assisted person M bend in the initial state of assistive apparatus 1. More specifically, in the present embodiment, as illustrated in FIG. 2, the above "knee bending position PKb" is an intersection point between upper leg virtual line NL1 passing through the center portion of upper leg portion Mh of assisted person M and extending in the extension direction of upper leg portion Mh, and lower leg virtual line NL2 passing through the center portion of lower leg portion Me of assisted person M and extending in the extension direction of lower leg portion Me when starting the assistance of the standing operation. As described above, first arm 21 is configured so that second center axis 22A is located ahead of knee bending position PKb of assisted person M while tilting rearward in the initial state of assistive apparatus 1.

Second center axis 22A may be located directly above knee pad member 80 or ahead of knee pad member 80 in the initial state of assistive apparatus 1. In addition, as illustrated in FIGS. 4 and 5, second center axis 22A may be located ahead of a front end of a portion of trunk support portion 41 in contact with the trunk in the standing support state where trunk support portion 41 supports the trunk of assisted person M in the standing posture. First arm 21 and second arm 22 are configured to have a positional relationship between first center axis 21A and second center axis 22A as described above, respectively. Supplementally, first arm 21 extends from first center axis 21A to a height at which the chest portion Mb of assisted person M is located, and is tilted rearward in the initial state of assistive apparatus 1.

In the initial state of assistive apparatus 1, second arm 22 ensures the length in the horizontal direction from second center axis 22A to the front surface of support member 40 in contact with the chest portion Mb of assisted person M. In addition, second arm 22 is configured to extend obliquely rearward from second center axis 22A to a connecting portion with support member 40 in the standing support state of assistive apparatus 1.

As described above, by ensuring a predetermined length of second arm 22, a sufficient space can be formed between both legs Mg and first arm 21 in a posture in which assisted person M contacts the chest portion with support member 40.

As a result, it is possible to prevent the interference between the members other than knee pad member 80 and both legs Mg of assisted person M while ensuring a range in which the position of knee pad member 80 can be adjusted. In addition, as illustrated in FIG. 4, by ensuring the length of second arm 22, it is possible to lift support member 40 to a sufficient height as well as first arm 21 in the standing support state.

As illustrated in FIG. 5, movable range Rm1 of first arm 21 may include an angle at which first virtual line ML1 passing through first center axis 21A and second center axis 22A is in the vertical direction. In the present embodiment, movable range Rm1 of first arm 21 is set to a range in which first virtual line ML1 can revolve back and forth by 25 degrees with respect to an angle coincident with a vertical axis.

In addition, as illustrated in FIG. 6, movable range Rm2 of second arm 22 may include an angle at which second virtual line ML2 passing through second center axis 22A and the reference position set in support member 40 is in the horizontal direction. In the present embodiment, movable range Rm2 of second arm 22 is set to a range in which second virtual line ML2 can revolve up and down by 25 degrees with respect to an angle coincident with a horizontal axis.

As illustrated in FIG. 2, lower reference position Pb and upper reference position Pu may be set in the above reference position. Lower reference position Pb is set at a lower end of a portion of trunk support portion 41 in contact with the trunk. In addition, as illustrated in FIG. 2, upper reference position Pu is set at an upper end of a portion of trunk support portion 41 in contact with the trunk. Upper reference position Pu may be set at a position of the side of assisted person M.

3. Operation Processing of Standing Operation by Assistive Apparatus 1

Operation processing for assisting the standing operation by assistive apparatus 1 will be described with reference to FIGS. 2 to 7. The above operation processing of the standing operation includes a first step of moving forward support member 40 and a second step of moving forward and lifting support member 40. The first step and the second step of the operation processing are actually executed in series, and in a case where support member 40 follows a smooth movement trajectory, it is not always possible to feel the switching of steps.

In the present embodiment, a step of advancing support member 40 so that the mass of the upper half body of assisted person M is substantially placed on support member 40 is referred to as a first step. The first step includes an operation of revolving second arm 22 rearward in parallel with revolving first arm 21 forward at an initial stage of the standing operation. By executing the first step, assisted person M shifts from the sitting posture, which is the initial state illustrated in FIG. 2, to the intermediate posture in which the upper half body illustrated in FIG. 3 is tilted forward. In addition, a step of advancing and lifting support member 40 so as to lift the upper half body of assisted person M is referred to as a second step. At this time, assisted person M shifts from the intermediate posture illustrated in FIG. 3 to the standing posture in which both legs Mg is extended, which is the end state illustrated in FIG. 4.

Here, when the revolving of first arm 21 and the revolving of second arm 22 cooperate with each other, swinging support member 40 may have a portion that advances and a portion that retreats with respect to base 10, and similarly, may have a portion that rises and a portion that descends with respect to base 10. Therefore, hereinafter, a movement of a reference position set to a position that is integrally moved with support member 40 will be described as a movement of support member 40. As illustrated in FIG. 2, lower reference position Pb and upper reference position Pu may be set in the above reference position.

As illustrated in FIGS. 2 to 5, lower reference position Pb moves along first movement trajectory Tb during the standing operation of assisted person M. In addition, during the standing operation of assisted person M, upper reference position Pu moves along second movement trajectory Tu.

That is, control device 70 controls the movement of support member 40 in cooperation with the revolving of first arm 21 and the revolving of second arm 22 so that lower reference position Pb moves along first movement trajectory Tb or so that upper reference position Pu moves along second movement trajectory Tu.

As illustrated in FIG. 2, at the initial stage of the operation processing for assisting the standing operation, assisted person M is in a seated state (state of the sitting posture) in which buttocks Mt is in contact with seat surface 91 of chair 90. Assistive apparatus 1 is placed in the initial state of operation processing for assisting the standing operation by an operation by assisted person M or the assisting person. The above operation includes the positional adjustment of assistive apparatus 1 with respect to assisted person M, and the height adjustment of support member 40 in accordance with the physique or the like of assisted person M.

In the initial state of assistive apparatus 1, assisted person M places both legs on foot placing table 12. At this time, assisted person M causes the front surface of the trunk to be in surface contact with trunk support portion 41. In addition, assisted person M causes the knee to come into contact with the rear surface of knee pad member 80. Furthermore, assisted person M grips first handle 51. At this time, depending on the physique of assisted person M, a certain gap may occur between the side of assisted person M and side support portion 42. As described above, in the initial state where preparation for the boarding in assistive apparatus 1 is finished, assisted person M is placed in a posture in which the upper half body is tilted forward to some extent, as illustrated in FIG. 2.

Subsequently, when assisted person M or the assisting person presses standing button 63 of controller 60 to input the assistance request for the standing operation, control device 70 executes the first step of changing assisted person M from the initial sitting posture to the intermediate posture in which the upper half body is tilted forward, as illustrated in FIG. 7 (S10). Specifically, control device 70 first determines whether second arm 22 is located at revolving end on rear side of movable range Rm2 (S11). Control device 70 acquires the revolving position of second arm 22 and performs the above-described determination, for example, based on the operation state of second actuator 32 of driving device 30.

In a case where second arm 22 is located ahead of the revolving end on rear side of movable range Rm2 (S11: No), control device 70 causes first arm 21 to revolve forward and causes second arm 22 to revolve rearward (S12). As a result, control device 70 advances support member 40 with respect to base 10, and maintains or lowers the height of support member 40 with respect to base 10.

On the other hand, in a case where second arm 22 is located at the revolving end on rear side of movable range Rm2 (S11: Yes), since the rearward revolving of second arm 22 is restricted, control device 70 causes first arm 21 to revolve forward in a state where second arm 22 is stopped with respect to second center axis 22A (S13). As a result, control device 70 advances support member 40 with respect to base 10.

Subsequently, control device 70 determines whether first arm 21 is less than a predetermined angle (S14). Control device 70 acquires the revolving position of first arm 21 and performs the above-described determination, for example, based on the operation state of first actuator 31 of driving device 30. In a case where first arm 21 is less than the predetermined angle (S14: No), control device 70 repeats the above-described processing (S11 to S13).

As a result, for example, in a case where second arm 22 reaches the revolving end on rear side of movable range Rm2 before first arm 21 reaches the predetermined angle, first arm 21 is revolved forward in a state where the rearward revolving of second arm 22 is stopped. In addition, in a case where first arm 21 reaches the predetermined angle (S14: Yes), assuming that assisted person M shifts to the intermediate posture, control device 70 ends the first step (S10), and shifts to the execution of the second step (S20).

Here, in the first step, when first arm 21 is revolved forward, second center axis 22A moves forward with respect to base 10 and moves upward. At this time, control device 70 controls the rearward revolving of second arm 22 with respect to the forward revolving of first arm 21 so that the angle of support member 40 is maintained. At this time, since the mass of the upper half body of assisted person M is gradually placed on support member 40 in the first step, the angle of support member 40 is preferably controlled so as to be maintained or tilted forward.

According to the control as described above, the amount of change (θ12-θ11) of first angles θ11 and θ12 formed by the horizontal axis and first virtual line ML1 before and after the execution of the forward revolving of first arm 21 is equal to or less than the amount of change (θ22-θ21) of second angles θ21 and θ22 formed by first virtual line ML1 and second virtual line ML 2 before and after the execution of the rearward revolving of second arm 22. First angle θ12 after the execution of the first step corresponds to the predetermined angle of first arm 21.

In addition, angles θ31 and θ32 of support member 40 before and after the execution of the first step are maintained or slightly increased (θ31≤θ32). Furthermore, in the first step, each of upward movement amounts BV1 and UV1 of lower reference position Pb and upper reference position Pu sets in support member 40 is approximately 0. In addition, in the first step, lower reference position Pb and upper reference position Pu advance by advance amounts BH1 and UH1.

As a result, in the first step, assisted person M supported by support member 40 is placed in the intermediate posture (refer to FIG. 3) in which the upper half body of assisted person M is tilted forward from the initial sitting posture (refer to FIG. 2). At this time, lower reference position Pb moves along first movement trajectory Tb from position Pb1 to position Pb2, as illustrated in FIG. 5. Similarly, upper reference position Pu moves along second movement trajectory Tu from position Pu1 to position Pu2. As described above, the operation of bending a waist portion so as to shift from the sitting posture to the intermediate posture as the first stage of the standing operation is a natural operation close to the operation in which assisted person M places weight on support member 40 while bending the waist portion by himself.

Subsequently, the operation processing of the standing operation is continued, and control device 70 executes the second step (S20) of causing first arm 21 and second arm 22 to revolve forward to change assisted person M from the intermediate posture to the standing posture. Specifically, control device 70 continues the forward revolving of first arm 21, and switches the operation of second arm 22 from the rearward revolving or the stopped state to the forward revolving.

In a case where first arm 21 does not reach a revolving end on front side of movable range Rm1 (S22: No), control device 70 maintains the forward revolving of first arm 21. On the other hand, in a case where first arm 21 reaches the revolving end on front side of movable range Rm1 (S22:

Yes), control device 70 stops the forward revolving of first arm 21 (S23). Similarly, in a case where second arm 22 does not reach the revolving end on front side of movable range Rm2 (S24: No), control device 70 maintains the forward revolving of second arm 22. On the other hand, in a case where second arm 22 reaches the revolving end on front side of movable range Rm2 (S24: Yes), control device 70 stops the forward revolving of second arm 22 (S25).

According to the control as described above, control device 70 controls driving device 30 so that first arm 21 and second arm 22 both revolve forward at the initial stage of the second step (S20). By executing the second step, lower reference position Pb and upper reference position Pu set in support member 40 rise only by upward movement amounts BV2 and UV2, and advance only by advance amounts BH2 and UH2. As a result, in the second step, assisted person M supported by support member 40 is to be placed in a standing posture (refer to FIG. 4) with both legs Mg of assisted person M extended from the intermediate posture (refer to FIG. 3).

At this time, lower reference position Pb moves along first movement trajectory Tb from position Pb2 to position Pb3, as illustrated in FIG. 5. Similarly, upper reference position Pu moves along second movement trajectory Tu from position Pu2 to position Pu3. As a result, the upper half body of assisted person M advances while lifting from the intermediate posture. Accordingly, in the second step, the state where the back muscle of assisted person M is extended is maintained. In addition, the upper half body of assisted person M is stably supported by support member 40.

Position Pb3 reached by lower reference position Pb at the end of the second step may appropriately change on first movement trajectory Tb. For example, in a case where the assistance request is no longer inputted to assistive apparatus 1, control device 70 ends the operation processing of the standing operation. Therefore, depending on lower reference position Pb (position Pb3) at the end, assisted person M in the standing posture may be placed in a state where, for example, the knee is not in contact with knee pad member 80, in addition to the posture illustrated in FIG. 4. This also applies to the relationship between upper reference position Pu and position Pu3.

4. Effects by Configuration of Embodiment

The assistive apparatus 1 according to the embodiment is provided with base 10 on which both legs Mg of assisted person M are placed, first arm 21 revolved around horizontal first center axis 21A, second arm 22 revolved around horizontal second center axis 22A, support member 40 supporting the upper half body of assisted person M, and driving device 30 revolving first arm 21 and second arm 22. In addition, first arm 21 is configured so that second center axis 22A is located behind first center axis 21A in the initial state and is located ahead of knee bending position PKb at which upper leg portion Mh and lower leg portion Me of assisted person M bend.

In addition, the operation processing of assisting the standing operation includes the first step (S10) of causing first arm 21 to revolve forward and causing second arm 22 to revolve rearward (S12) or stop (S13) so that assisted person M supported by support member 40 is placed in the intermediate posture in which the upper half body is tilted forward from the initial sitting posture, and the second step (S20) of causing first arm 21 and second arm 22 to revolve forward (S21) so that assisted person M is placed in the standing posture from the intermediate posture.

With the above configuration, support member 40 can be moved along predetermined movement trajectories Td and Tu by first arm 21 and second arm 22 constituting the mechanism having two joints with respect to base 10. As a result, assistive apparatus 1 can assist the standing operation of assisted person M. In addition, driving device 30 has a configuration for causing the revolving of first arm 21 and the revolving of second arm 22 to cooperate with each other, so that it is possible to downsize assistive apparatus 1 and reduce the manufacturing cost as compared with a configuration including a linear motion device or three or more rotating devices.

5. Modified Aspect of Embodiment

In the embodiment, the reference position is set at a lower end or an upper end of the portion of trunk support portion 41 in contact with the trunk of assisted person M, or a position of a side of assisted person M. On the other hand, the reference position can be set at an appropriate position when the reference position is set at a position moving integrally with support member 40. For example, the reference position may be set at the position of the chest portion Mb of assisted person M in a configuration in which support member 40 is provided with the trunk support portion as illustrated in the embodiment. In addition, the reference position may be set at a connecting portion between support member 40 and second arm 22. In such a configuration, the same effect as that of the embodiment is obtained.

In addition, the operation processing of the standing operation includes two steps of the first step and the second step executed in series. On the other hand, another step may be appropriately included in the operation processing of the standing operation. For example, the operation processing may include a preparation step for changing assistive apparatus 1 from a current state to an initial state, a recovery step in a case where each step once executed is stopped and then restarted, and the like. Control device 70 may be configured to control the movement of support member 40 by combining various steps and cooperating the revolving of first arm 21 and the revolving of second arm 22, based on these operation states of assistive apparatus 1 and the assistance request or the adjustment request to be inputted.

Although the first step and the second step are defined as described above in the embodiment, the steps may be classified by the angles of first arm 21 and second arm 22, the position of lower reference position Pb in first movement trajectory Tb, the position of upper reference position Pu in second movement trajectory Tu, the angle of support member 40, the posture of assisted person M, or the like. In either classification, in the step of shifting from the sitting posture to the intermediate posture, the same effect as that of the embodiment can be obtained by causing first arm 21 to revolve forward while causing second arm 22 to revolve rearward (stopping in a case of reaching the revolving end on rear side of movable range Rm2).

What is claimed is:

1. An assistive apparatus comprising:
- a base;
- a first arm provided on the base and configured to revolve around a horizontal first center axis;
- a second arm provided on the first arm and configured to revolve around a horizontal second center axis;
- a support member provided on the second arm and configured to support an upper half body of an assisted person;

a control device configured to perform a cooperative operation of the first arm and the second arm in assisting a standing operation of the assisted person supported by the support member, wherein the first arm is configured to be located ahead of a knee bending position at which an upper leg portion and a lower leg portion of the assisted person bend in an initial state before execution of assistance of the standing operation;

a first actuator which is a telescopic actuator, a first end of which is provided on the base and a second end of which is provided on the first arm, and configured to cause the first arm to revolve forward around the first center axis by an extension operation, and a second actuator which is a telescopic actuator, a first end of which is provided on the first arm and a second end of which is provided on the second arm, and configured to cause the second arm to revolve forward around the second center axis by the extension operation.

2. The assistive apparatus according to claim 1, wherein the knee bending position is an intersection point between an upper leg virtual line passing through a center portion of the upper leg portion of the assisted person and extending in an extension direction of the upper leg portion and a lower leg virtual line passing through a center portion of the lower leg portion of the assisted person and extending in an extension direction of the lower leg portion when starting the assistance of the standing operation.

3. The assistive apparatus according to claim 2, wherein the first arm extends upward from the first center axis in the initial state, and the second arm extends rearward from the second center axis in the initial state.

4. The assistive apparatus according to claim 1, wherein the first arm extends upward from the first center axis in the initial state, and the second arm extends rearward from the second center axis in the initial state.

5. The assistive apparatus according to claim 4, wherein a movable range of the first arm includes an angle at which a first virtual line passing through the first center axis and the second center axis is in a vertical direction, and a movable range of the second arm includes an angle at which a second virtual line passing through the second center axis and a reference position of the support member is in a horizontal direction.

6. The assistive apparatus according to claim 5, wherein the first arm is formed in a linear shape along the first virtual line so as to extend upward from the first center axis.

7. The assistive apparatus according to claim 5, wherein the support member includes a trunk support portion formed in a planar shape, and configured to support a trunk in surface contact with a front surface of the trunk of the upper half body of the assisted person, and a side support portion supported by the trunk support portion and configured to support a side of the assisted person, and the reference position is set at a lower end or an upper end of a portion of the trunk support portion configured to be in contact with the trunk or a position of the side of the assisted person.

8. The assistive apparatus according to claim 1, wherein the first actuator and the second actuator are provided behind the first arm.

9. The assistive apparatus according to claim 8, wherein the first actuator is provided so as to be tilted forward from the base side toward the first arm side, and the second actuator is provided above the first actuator and is provided so as to be tilted rearward from the first arm side toward the second arm side.

10. The assistive apparatus according to claim 1, wherein a posture in which buttocks are lifted from a sitting posture, a lower half body stands, and the upper half body is tilted forward is defined as a standing posture of the assisted person, the support member includes a trunk support portion formed in a planar shape and configured to support a trunk in surface contact with a front surface of the trunk of the upper half body of the assisted person, the trunk support portion supports the trunk of the assisted person in the standing posture, and the first arm is formed so that the second center axis is located ahead of a front end of a portion of the trunk support portion configured to be in contact with the trunk in a state where the trunk support portion supports the trunk of the assisted person in the standing posture.

11. The assistive apparatus according to claim 1, further comprising:

a knee pad member provided on the base and is configured to abut knee of the assisted person assisted in the standing operation abuts, wherein the first arm is disposed so that the first center axis is located between the base and the knee pad member in the up-down direction, and is disposed so that the second center axis is located directly above the knee pad member or ahead of the knee pad member in the initial state.

12. An assistive apparatus comprising:

a base;

a first arm provided on the base and configured to revolve around a horizontal first center axis;

a second arm provided on the first arm and configured to revolve around a horizontal second center axis;

a support member provided on the second arm and configured to support an upper half body of an assisted person;

a control device configured to perform a cooperative operation of the first arm and the second arm in assisting a standing operation of the assisted person supported by the support member; and a first actuator which is a telescopic actuator, a first end of which is provided on the base and a second end of which is provided on the first arm, and configured to cause the first arm to revolve forward around the first center axis by an extension operation, and a second actuator which is a telescopic actuator, a first end of which is provided on the first arm and a second end of which is provided on the second arm, and configured to cause the second arm to revolve forward around the second center axis by the extension operation, wherein operation processing for assisting the standing operation includes a first step of revolving the second arm rearward in parallel with revolving the first arm forward at an initial stage of the standing operation.

13. The assistive apparatus according to claim 12, wherein the control device causes rearward revolving of the second arm to cooperate with forward revolving of the first arm so that a height of a reference position of the support member is maintained or lowered in a case where the first arm is revolved forward and the second arm is revolved rearward in the first step.

14. The assistive apparatus according to claim 12, wherein the control device causes rearward revolving of the second arm to cooperate with forward revolving of the first arm so that an angle of the support member is maintained when revolving the second arm rearward in parallel with revolving the first arm forward in the first step.

15. An assistive apparatus comprising:

a base;

a first arm provided on the base and configured to revolve around a horizontal first center axis;

a second arm provided on the first arm and configured to revolve around a horizontal second center axis;

a support member provided on the second arm and configured to support an upper half body of an assisted person; and a control device configured to perform a cooperative operation of the first arm and the second arm in assisting a standing operation of the assisted person supported by the support member, wherein operation processing for assisting the standing operation includes a first step of revolving the second arm rearward in parallel with revolving the first arm forward at an initial stage of the standing operation, and wherein the control device causes rearward revolving of the second arm to cooperate with forward revolving of the first arm so that an angle of the support member is maintained when revolving the second arm rearward in parallel with revolving the first arm forward in the first step.

* * * * *